A. W. PERLITZ.
CABLE FASTENER.
APPLICATION FILED JULY 19, 1921.
1,415,112. Patented May 9, 1922.
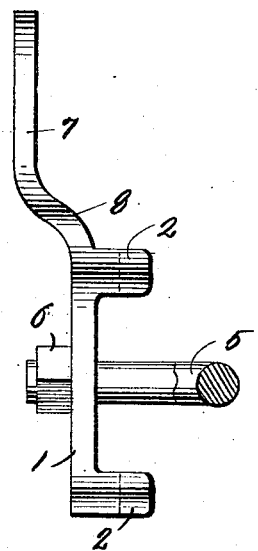
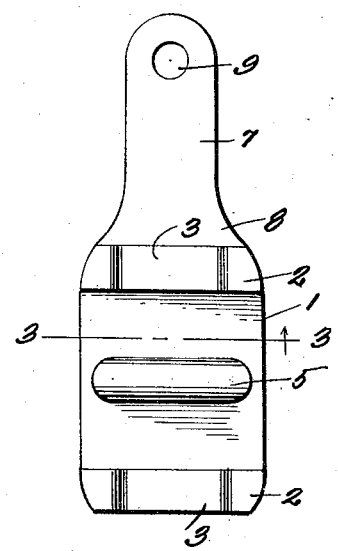
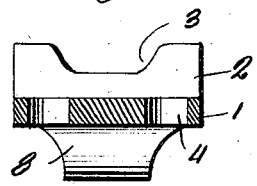
ALFRED W. PERLITZ INVENTOR.
WITNESSES
BY
ATTORNEY.

UNITED STATES PATENT OFFICE.

ALFRED W. PERLITZ, OF YOUNGSTOWN, OHIO.

CABLE FASTENER.

1,415,112. Specification of Letters Patent. Patented May 9, 1922.

Application filed July 19, 1921. Serial No. 485,840.

*To all whom it may concern:*

Be it known that ALFRED W. PERLITZ, a citizen of the United States, residing at Youngstown, in the county of Mahoning and State of Ohio, has invented certain new and useful Improvements in a Cable Fastener, of which the following is a specification.

This invention relates to a cable fastener which is used in connecting dead ending electrical cables to cross arms on pole on steel towers and has for its principal object to generally improve upon devices of this character by providing a device which will be of extremely simple, durable and inexpensive construction, one which is efficient and reliable in operation, and well adapted to the purpose for which it is designed.

With the above and numerous other objects in view, the invention resides in certain novel features of construction and the arrangement of parts as will be hereinafter fully described and claimed.

In the drawings:—

Figure 1 is an elevational view of the fastener, a portion thereof being shown in section, Figure 2 is an elevational view thereof taken at right angles to the view shown in Figure 1, and Figure 3 is a section taken on the line 3—3 of Figure 2 looking in the direction of the arrow.

Referring to the drawings in detail it will be seen that the body portion 1 is provided with the right angularly extending lug members 2 which are dished out at their ends so as to form channels 3 upon which will rest the cable to be fastened to this device. These lugs 3 are suitably spaced from each other and the body portion is provided with a pair of spaced apertures 4, shown in Figure 3, through which pass the ends of a U-bolt 5. The ends of this U-bolt 5 are threaded for receiving nuts 6. The central portion of the U-bolt 5 is adapted to engage the cable and hold the same firmly in engagement with the lugs 2 and thus it will be readily appreciated that it will be quite impossible to remove the cable from engagement with the fastener except by removing the nuts 6. An offset shank or extension 7 is connected to the body portion by means of the curved neck 8 and this shank 7 extends parallel with the body portion 1 and is provided with an opening 9 for receiving a nail or any other suitable fastening means in order that the fastener may be fixed to a support in any desired manner. This extension or shank 7 being offset will in no way interfere with the cable and will prevent the same from coming into contact with the support.

From the foregoing description, taken in connection with the accompanying drawings, the construction and operation of the fastener will be readily understood without a more extended explanation. As numerous changes in form, proportion, and in the minor details of construction may be resorted to without departing from the spirit of this invention I do not wish to be limited to the construction herein shown and described other than as claimed.

Having thus described my invention what I claim as new is:—

1. A fastening element of the class described comprising a body portion provided with a pair of apertures situated intermediate its ends, a pair of spaced lugs projecting at right angles from the body portion and provided with channels in their ends, a U-bolt and nuts therefor adapted to be attached to the body portion by extending through the apertures provided therein.

2. A fastening element of the class described comprising a body portion provided with a pair of apertures situated intermediate its ends, a pair of spaced lugs projecting at right angle from the body portion and provided with channels in their ends, a U-bolt and nuts therefor adapted to be attached to the body portion by extending through the apertures provided therein, a curved neck extending from the body portion, a shank provided with apertures extending from the neck parallel with the body portion.

In testimony whereof I affix my signature in presence of two witnesses.

ALFRED W. PERLITZ.

Witnesses:
WILLIAM WILLIAMS,
DANIEL J. NEWLY.